United States Patent [19]

Minamisono

[11] Patent Number: 5,218,359
[45] Date of Patent: Jun. 8, 1993

[54] ADAPTIVE ARRAY ANTENNA SYSTEM

[75] Inventor: Kenichi Minamisono, Saitama, Japan

[73] Assignee: Kokusai Denshin Denwa Co., Ltd., Tokyo, Japan

[21] Appl. No.: 920,708

[22] Filed: Jul. 28, 1992

[30] Foreign Application Priority Data

Aug. 6, 1991 [JP] Japan .................................. 3-219348

[51] Int. Cl.$^5$ ............................................. G01S 3/16
[52] U.S. Cl. ...................................... 342/383; 342/378
[58] Field of Search ............... 342/378, 379, 380, 383

[56] References Cited

U.S. PATENT DOCUMENTS

| H374 | 11/1987 | Abo-Zena et al. | 342/378 |
| 4,017,859 | 4/1977 | Medwin | 342/383 |
| 4,577,193 | 3/1986 | Kiuchi et al. | 342/380 |

OTHER PUBLICATIONS

IEEE Transactions on Acoustics, Speech, and Signal Processing, vol. ASSP-33, No. 4, Aug. 1985.

*Primary Examiner*—Gregory C. Issing
*Attorney, Agent, or Firm*—Nikaido, Marmelstein, Murray & Oram

[57] ABSTRACT

An adaptive array antenna having a plurality of antenna elements (1-1 through 1-N), related weight circuits (4-1 through 4-N) for weighting amplitude and phase of receive signal by each antenna element, and a combiner (5) for combining weighed signals, has a plurality of antenna beams at the same time by determining weights of said weight circuits, so that a plurality of receive signals due to multipath transmission are received for obtaining high receive level while avoiding multipath interference. Receive signals are converted to digital form, which is stored in a memory (3) for calculation, in which it is first determined whether a receive signal in each beam direction exists or not, selecting at least one direction beam in which receive signal in that direction beam has less mutual delay time from reference signal in reference direction beam than a predetermined delay time, adjusting phase of all the selected direction beams which have selected receive signal so that receive phase of all the selected direction beams are in phase, and determining weights of said weight circuit so that the antenna has a plurality of direction beams simultaneously for the selected receive signals.

5 Claims, 7 Drawing Sheets

ADAPTIVE ARRAY ANTENNA SYSTEM

BACKGROUND OF THE INVENTION

The present invention relates to an array antenna, in particular, relates to an adaptive direction beam control system of such an antenna for avoiding interference due to multipath propagation.

An adaptive array antenna adjusts directivity of an antenna adaptively so that the antenna receives the most preferable wave among a plurality of waves which reach the antenna for avoiding effect of multipath propagation. The most preferable wave may be a direct wave which is received directly from a transmit point, a wave which has the least delay time, or a wave which has the highest receive level.

FIG. 2 shows a conventional adaptive array antenna. In the figure, the numeral 1 (1-1 through 1-N) shows antenna elements, 4 (4-1 through 4-N) shows variable complex weight circuits, 5 is a combiner, 6 is an error detector, and 7 is a complex weight control. The receive signal $X_n(t)$ by the n'th antenna element 1-n is applied to the n'th variable complex weight circuit 4-n which adjusts amplitude and phase of the receive signal by multiplying the receive signal and the complex weight $W_n$. The product $W_n X_n(t)$ is applied to the combiner 5 which combines the products of all the antenna elements, and provides the output signal Y(t) of the adaptive array antenna. The error detection circuit 6 measures the error between the evaluation function e(y) which depends upon the output signal Y(t) and the preferable value. The error signal thus measured is applied to the weight control 7 which adjusts weights $W_n(t)$ for each adaptive complex weight circuits 4-1 through 4-N so that the error becomes small.

Thus, an adaptive array antenna provides a receive signal through operation of feedback loop.

The operation of a conventional adaptive array antenna for avoiding effect of multipath interference is described in accordance with FIGS. 3 through 4. In those figures, the numeral 9 is a transmit point, 10 is a receive point, #1 through #5 are receive waves at the receive point 10 from the transmit point 9, $\theta_1$ through $\theta_5$ show receive angles of receive waves #1 through #5 at the receive point 10, $T_1$ through $T_5$ are delay times of the waves #1 through #5, respectively, at the receive point 10. The receive waves may be either direct wave #1, or reflected waves #2 through #5 reflected by the reflected bodies B2 through B5.

FIG. 3 shows an example of a multi-path propagation. The signal wave from the transmit point 9 reaches the receive point 10 through a plurality of propagation paths some of which reflect by buildings B2 through B5.

FIG. 4 shows the receive angle (FIG. 4A) and the delay time (FIG. 4B) of the receive signals #1 through #5 at the receive point 10.

In a prior art, the directivity of an antenna is adjusted so that the antenna receives one signal selected from a direct wave, a wave having the least delay time, or the highest level wave. In the example, the wave #1 is a direct wave, and has the highest level, and therefore, the directivity is adjusted so that it receives only the wave #1. The antenna in this case has only one beam.

When wideband digital communication is carried out in a large city, the relative delay time of the receive waves extends several times as long as the symbol interval of transmission signal. Further, it might be impossible sometimes to receive a direct wave. Although the receive G/T (Gain to Thermal) ratio or C/N (carrier to noise ratio) must be high in wideband communication, if all the receive signals are combined as they are in order to provide high receive level, the receive signal would be distorted when delay time extends widely.

Further, when it is impossible to receive a direct wave, if we receive a wave which has the least delay time, it might not provide enough receive level, since that wave is not always the highest wave of all the waves.

Further, if we select only one wave, other waves are not used, and therefore, the energy efficienty is low, since other waves might have the similar level to or even higher level than that of the selected wave, and have the same information as that the selected wave.

Thus, a prior adaptive array antenna must have sharp directivity in direction of a desired wave component, and must have so many antenna elements.

SUMMARY OF THE INVENTION

It is an object, therefore, of the present invention to overcome the disadvantages and limitations or a prior adaptive array antenna by providing a new and improved adaptive array antenna.

It is also an object of the present invention to provide an adaptive array antenna which adjusts directivity according to changing receive condition of receive waves.

It is also an object of the present invention to provide an adaptive array antenna which provides high receive level with low interference.

The above and other objects are attained by an adaptive array antenna comprising a plurality of antenna elements positioned on an antenna support; a plurality of weight circuits provided for each antenna element for weighting receive signal of related antenna element by adjusting amplitude and phase of receive signal; a combiner for combining outputs of said weight circuits in phase; control means for adjusting weights of said weight circuits; wherein a plurality of analog to digital converters are provided for each antenna element for converting receive signal to digital form; a memory for storing receive signal of antenna elements in digital form; said control means comprising; first means for selecting at least one directivity of arrival of signal components by using receive signals stored in said memory, so that signal component in the directivity of arrival has level higher than a predetermined level; second means for selecting a reference signal component among the selected signal components so that the reference signal has only one peak in auto-correlation and has the highest level among those having only one peak in auto-correlation; third means for providing relative delay time of selected signal components in each directivity of arrival for a reference signal by calculating cross-correlation between a reference signal and each signal component; fourth means for selecting signal components having less relative delay time than a predetermined value; fifth means for determining phase of said selected signal components so that phase of all the selected signal components is in phase; sixth means for weighting said weight circuit so that the array antenna has at least one beam for receiving signal components inphse selected by said fourth means.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The present invention is described in accordance with FIG. 1, and FIGS. 3 through 7. In those figures, the numeral 1-i (i=1 through n) is an antenna element, 2-i is an analog to digital converter, 3 is a memory for storing output of said analog to digital converter, 4-i is a variable complex weight circuit, 5 is a combiner, 6 is an error detector, 7 is a complex weight control, 8 is a memory for storing complex weight, 10 is a receive point, #1 through #5 are receive waves at the receive point 10, $\theta_1$ through $\theta_5$ are a direction-of-arrival of receive waves #1 through #5 at the receive point 10, $T_1$ through $T_5$ are delay time of the receive waves #1 through #5 at the receive point 10.

The transmit signal S from a transmit point reaches the receive point in a plurality of directions $\theta_1$ through $\theta_5$ through reflections and/or diffractions by buildings et al. Each receive wave is denoted by $S_m$ (m=1 through 5 in the embodiment). Each antenna element 1-i at the receive point receives all the receive waves. The receive waves are applied to the analog to digital converter 2-i which provides the receive waves in digital form, and the converted digital signal is stored in the memory 3 for the calculation of direction-of-arrivals and relative delay time.

It is supposed that $X_n$ (n=1, 2, 3, ..., n; n is number of antenna elements) shows a signal received by n'th antenna element 1-n, and Xn(k) (k=0, 1, 2, ..., k) is a sampled value of $X_n$ for every predetermined time $\Delta t$.

The receive angle of each signal component is obtained by scanning an angle space, by using $X_n(k)$. First, control value of amplitude and phase in the weight circuit is calculated and stored beforehand for providing a directivity in each predetermined direction. Then, the level of the signal in each direction is estimated by the product of the stored value in each direction and a receive signal. It is determined whether a signal exists or not according to the level. This method is described below.

Figure 5:
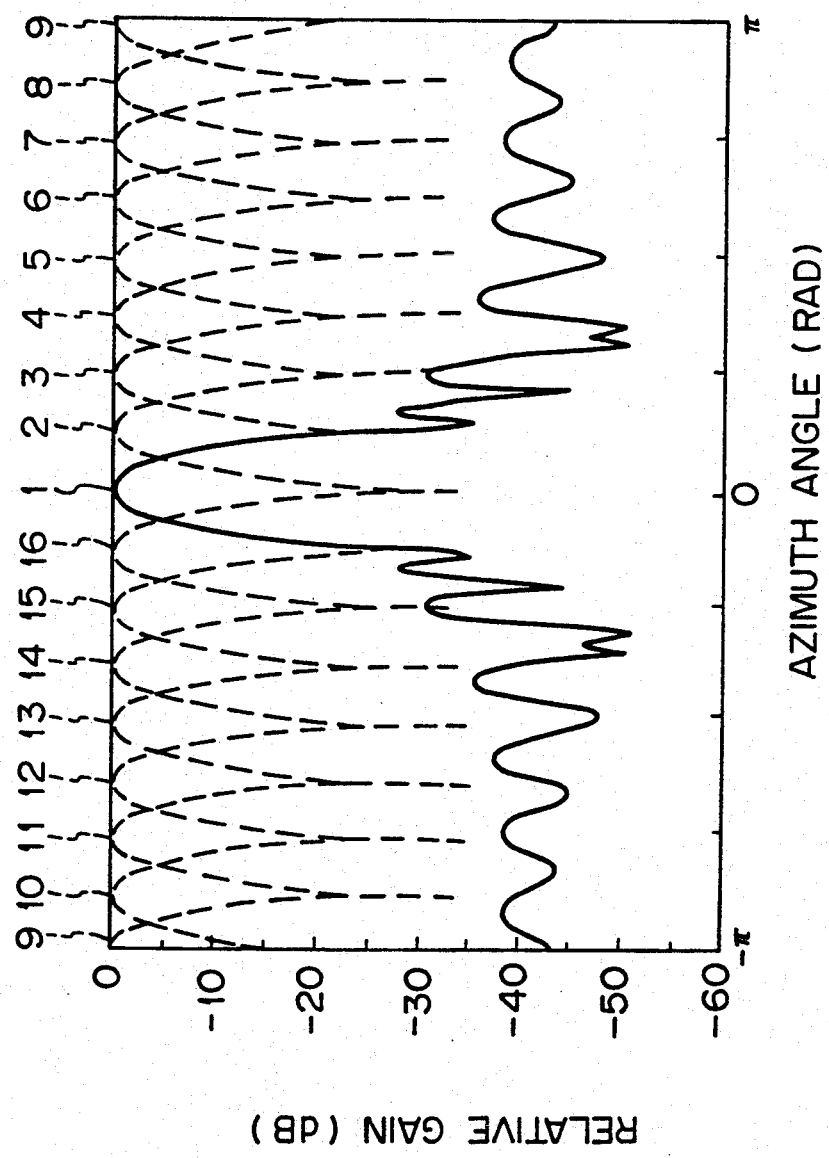
FIG. 5 is an example of directivity pattern for estimating direction of receive waves.

It is assumed that an array antenna has N number of antenna elements each of which has no directivity arranged on a circle. When the number of antenna elements is N, the beam width of an array antenna is approximately $360/2\pi N$ (degree). The number of antenna beams is determined so that the antenna beams cover all the angles (0° through 360°) as shown in FIG. 5. In the embodiment of FIG. 5, the antenna covers all the angles by 16 direction beams. The complex weight $W_{nd}$ for providing each antenna beam is calculated beforehand. Those weights $W_{nd}$ are stored in the weight memory 8 in FIG. 1. The signal component $Y_d(k)$ coming from the direction of d'th antenna beam is calculated by the equation (1) by using the complex weight $W_{nd}$ which provides d'th antenna beam, And, the level of $Y_d(k)$ is calculated by the equation (2).

$$Y_d(k) = \sum_{n=1}^{N} W_{nd} \cdot X_n(k) \tag{1}$$

$$|Y_d|^2 = \sum_{k=1}^{K} |Y_d(k)|^2 \tag{2}$$

The level (equation (2)) of $|Y_d|^2$ is compared with the noise level, and when the former is higher than the latter, it is determined that the signal coming from the direction of d'th antenna beam exists.

Alternatively, the angle of receive signal is determined through spatial smoothing method as described in T. J. Shan, M. Wax and T. Kailath "On Spatial Smoothing for Direction-of-Arrival Estimation of Coherent Signals", ASSP-33, No. 4, pp 806–811.

When the direction of arrival is determined, and the signal level in the direction of the d'th beam is obtained, the relative delay time of the signal is determined by using the above result. First, the reference signal component is selected. As the signal $Y_d(k)$ itself might be the combination of a plurality of signals each having different delay time, the reference signal component is determined so that it has high signal level, and has only single signal component.

Figure 6A:
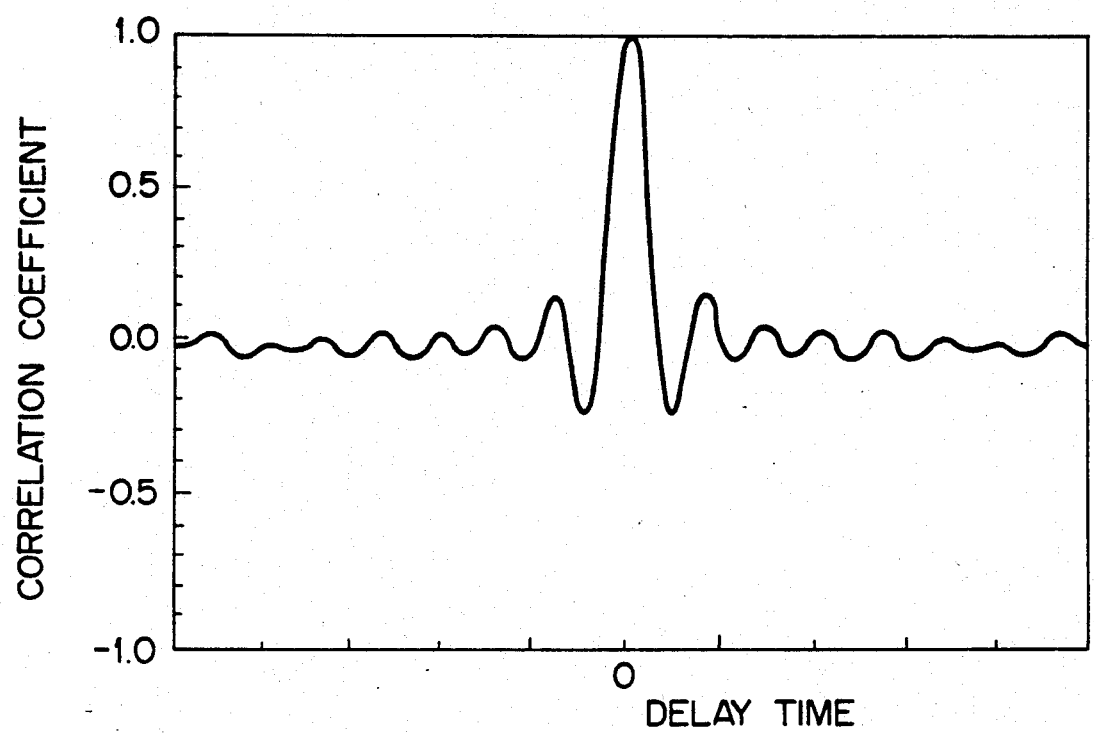
FIGS. 6a and 6b show examples of self correlation coefficients.
Figure 6B:
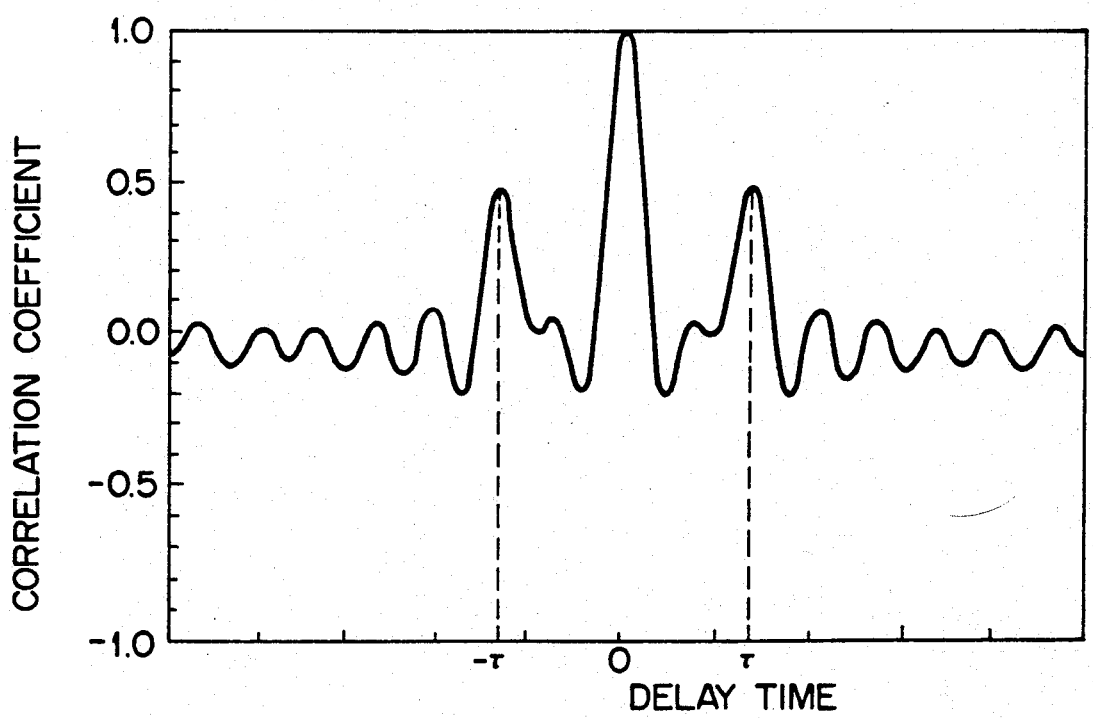
Figure 7:
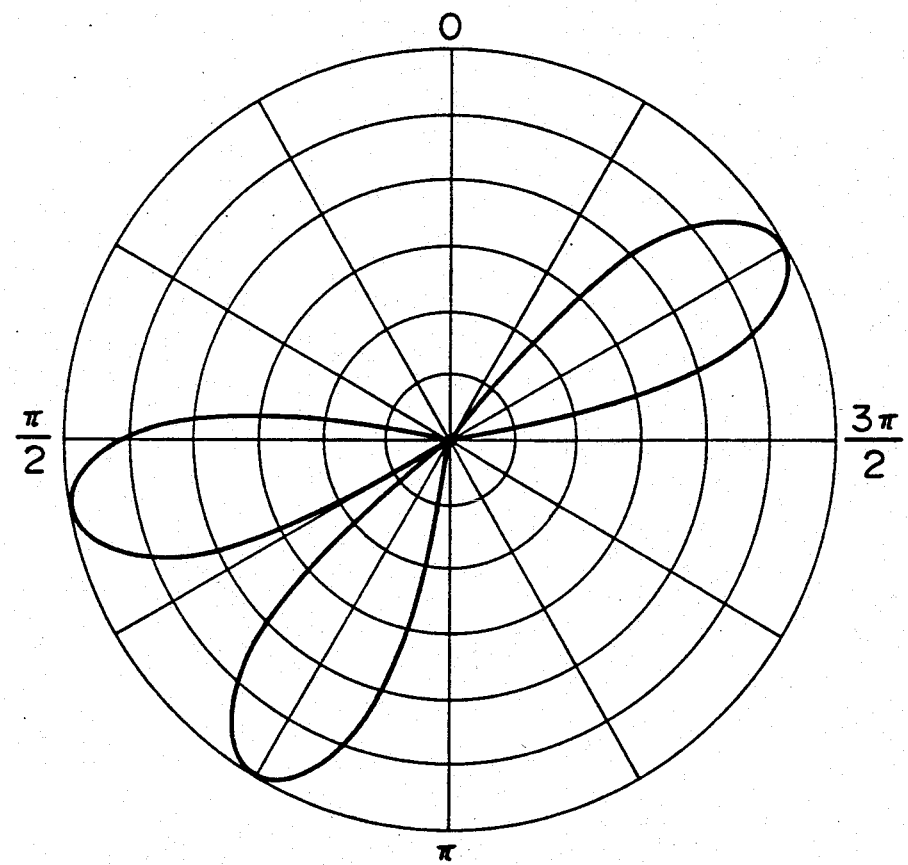
FIG. 7 shows an example of directivity of an adaptive array antenna according to the present invention.

When the receive signal has no delay component (no multipath component), the auto-correlation of the receive signal has the shape as shown in FIG. 6A, since it is supposed that the receive signal is modulated with random signal. On the other hand, when the receive signal has delay component (there exists multipath components), the auto-correlation of the receive signal has the shape as shown in FIG. 6B, which has a plurality of peak values at the corresponding relative delay times. Therefore, the calculation of the auto-correlation of the receive signal provides the information of the relative delay time of each signal components.

Therefore, the reference signal is selected in the signal components so that the self correlation has only one peak, and the receive level is the highest in those having only one peak in the self correlation.

When the reference signal component is determined, the cross-correlation between the reference signal and each signal component is calculated, and the relative delay time of the signal component is provided by the position of the peak value of the cross-correlation. Thus, the direction of arrival and the relative delay time of each signal component are determined.

Next, the signal components to be received are determined by considering that they are combined in phase, no signal distortion through combination increases, and the receive level is sufficiently high. Therefore, the signal component are determined as follows.

(1) The delay time width T is determined so that signal distortion by the combination is not serious. The preferable value T satisfying above condition is that T is less than 50% of the symbol spacing of the modulation signal of the receive signal.

(2) The value t is determined so that the signal power included between the relative delay times [t, t+T] is the highest. The value t thus obtained is denoted as $t_s$ (see FIG. 4B).

Figure 1:
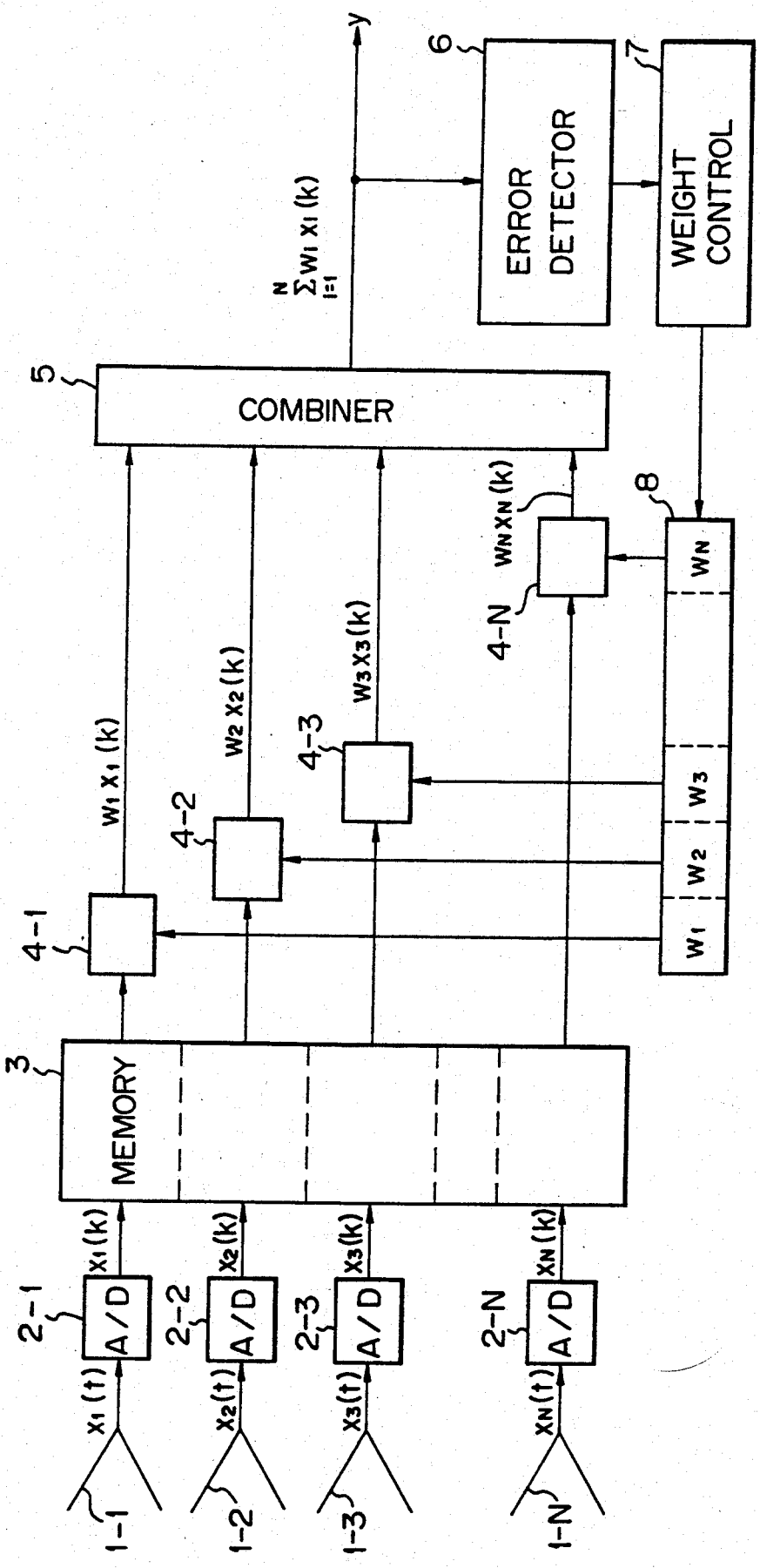
FIG. 1 is a block diagram of an adaptive array antenna according to the present invention.
Figure 2:
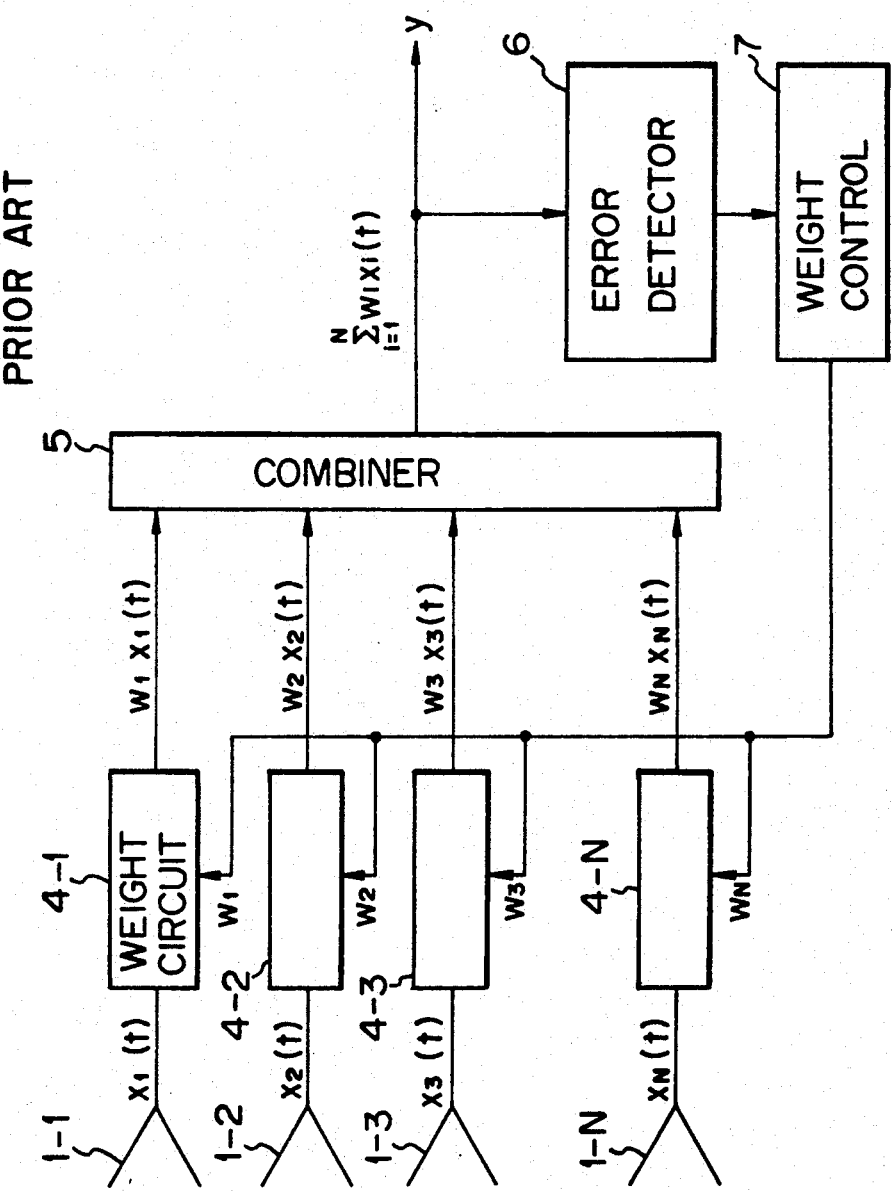
FIG. 2 is a block diagram of a prior adaptive array antenna.
Figure 3:
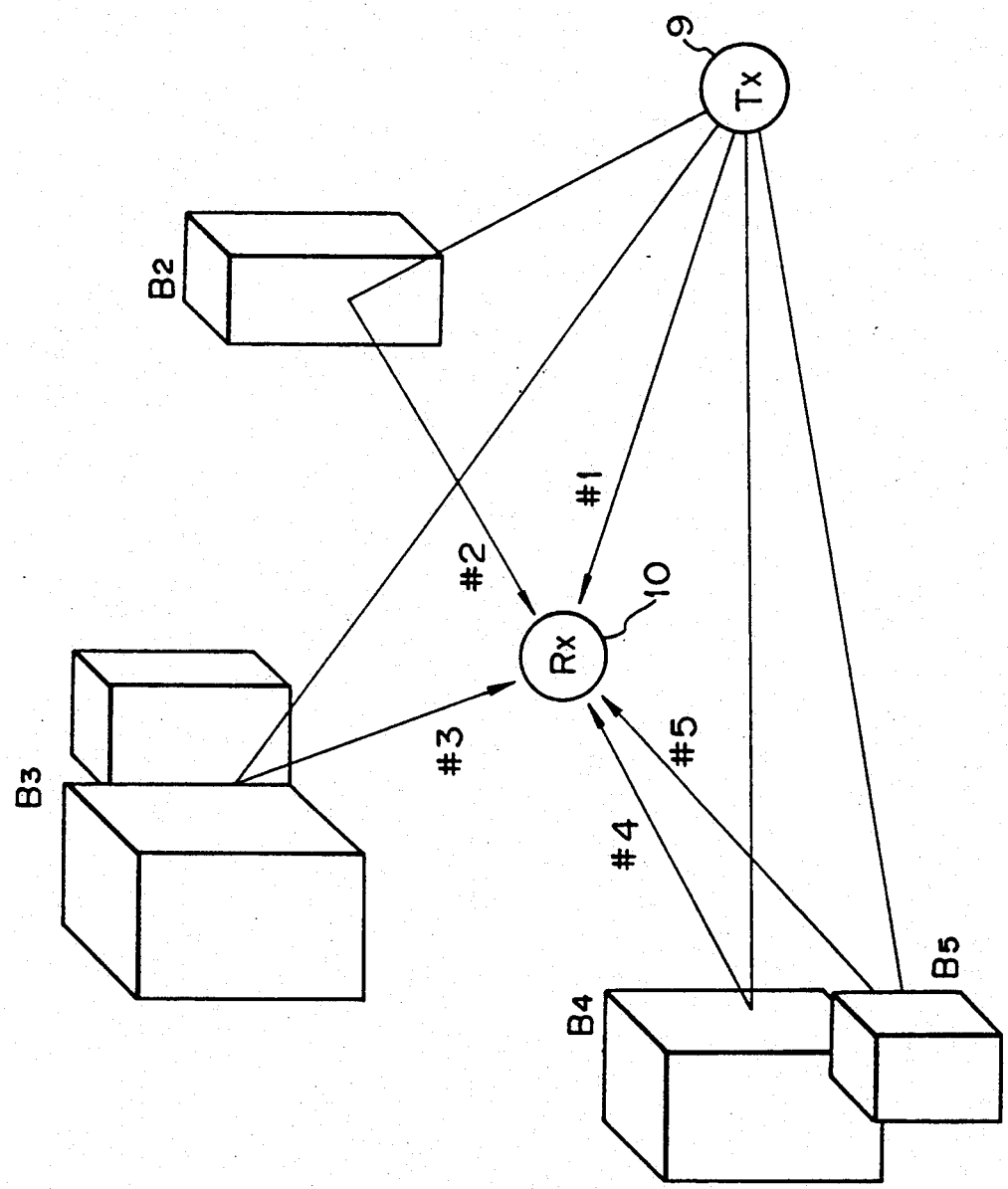
FIG. 3 shows exlanatory figure of multipath transmission.
Figure 4A:
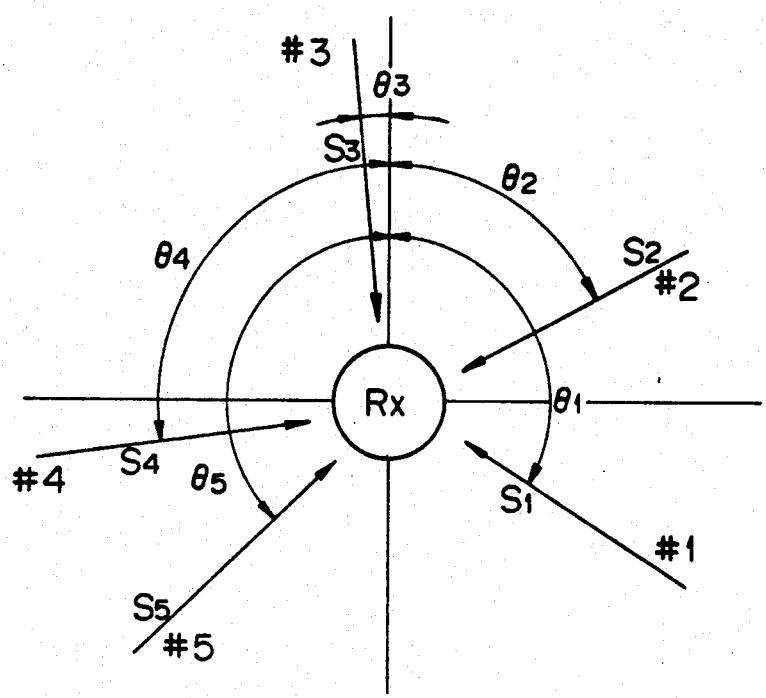
FIGS. 4a and 4b show examples of direction-of-arrivals of receive signal and delay time of receive signals for the explanation of the present invention.
Figure 4B:
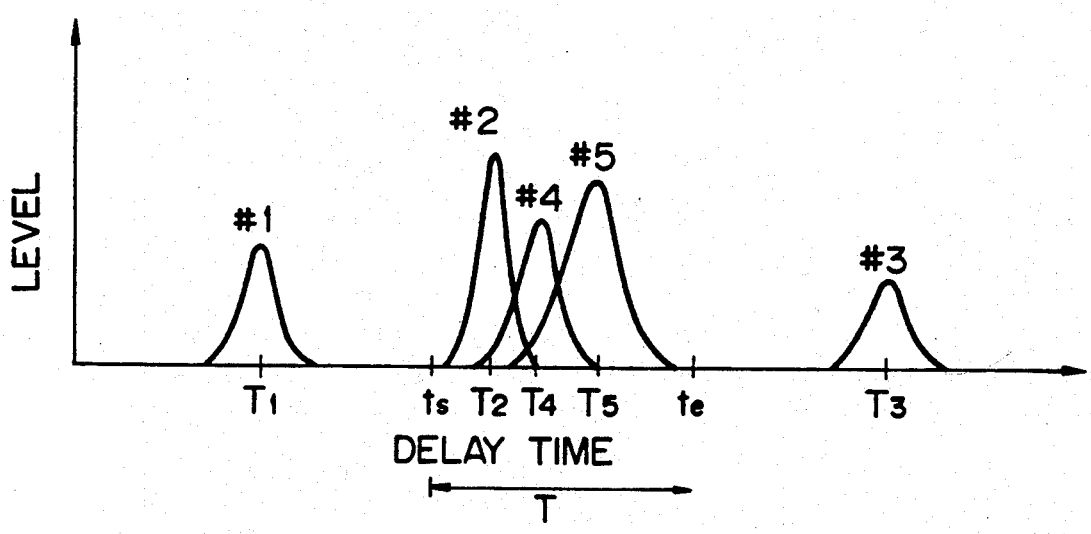

(3) The signal components between the relative delay times [$t_s$, $t_s$+T] are selected. In the embodiment of FIG. 4B, the beams #2, #4, and #5 are selected. Next, the phase difference of each selected beams at radio frequency from the phase of the reference signal is calculated so that all the beams are combined in phase, according to the radio frequency and each delay time.

As mentioned above, the direction and the phase of beams of an array antenna are determined. Then, the complex weight $W_n$ for providing the beams which satisfy said direction and said phase is determined. In case of conditions of FIG. 4, the characteristics of FIG. 7 in which #2, #4 and #5 beams are combined, are selected.

The calculation of the weight circuit for determining beams is carried out periodically, so that the period of the calculation is shorter than fading period. During the calculation, the receive signals are stored in the memory 3. Upon completion of the calculation and the determination of the beams, the receive signal stored in the memory 3 is read out and processed with the weights which provides the beams and the phase of each beams as determined.

As described above in detail, according to the present invention, the effect by multipath propagation is avoided, and high receive level is obtained, as only the beams which do not affect to distortion are selected, and the wideband communication is possible even under multipath propagation.

It should be appreciated that the number of antenna elements for the estimation of direction-of-arrivals and delay times, is the same as those for providing directivity of an array antenna. Therefore, the present array antenna provides the optimum directivity under given number of antenna elements.

From the foregoing it will now be apparent that a new and improved adaptive array antenna has been found. It should be understood of course that the embodiments disclosed are merely illustrative and are not intended to limit the scope of the invention. Reference should be made to the appended claims, therefore, for indicating scope of the invention.

What is claimed is:

1. An adaptive array antenna control system comprising;
   a plurality of antenna elements positioned on an antenna support,
   a plurality of weight circuits provided for each antenna element for weighting receive signal of related antenna element by adjusting amplitude and phase of receive signal,
   a combiner for combining outputs of said weight circuits in phase,
   control means for adjusting weights of said weight circuits,
   the improvements consist in:
   a plurality of analog to digital converters are provided for each antenna element for converting receive signal to digital form,
   a memory for storing receive signal of antenna elements in digital form,
   said control means comprising;
   first means for selecting at least one directivity of arrival of signal components by using receive signals stored in said memory, so that signal component in the directivity of arrival has level higher than a predetermined level,
   second means for selecting a reference signal component among the selected signal components so that the reference signal has only one peak in autocorrelation and has the highest level among those having only one peak in auto-correlation,
   third means for providing relative delay time of selected signal components in each directivity of arrival for a reference signal by calculating mutual correlation between a reference signal and each signal component,
   fourth means for selecting signal components having less relative delay time than a predetermined value,
   fifth means for determining phase of said selected signal components so that phase of all the selected signal components is in phase,
   sixth means for weighting said weight circuit so that the array antenna has a beam for receiving signal components inphase selected by said fourth means.

2. An adaptive array antenna system according to claim 1, wherein said first means determines presence of signal in d'th directivity of arrival when value $|Y_d|^2$ exceeds a predetermined value;

$$Y_d(k) = \sum_{n=1}^{N} W_{nd} \cdot X_n(k)$$

$$|Y_d|^2 = \sum_{k=1}^{K} |Y_d(k)|^2$$

where n is number of antenna elements,
$W_{nd}$ is weights of an array antenna for providing a single antenna beam in d'th direction,
$X_n(k)$ is k'th sampled value of receive signal by n'th antenna element stored in said memory.

3. An adaptive array antenna system according to claim 1, wherein said predetermined delay time is 50% of symbol period of modulation signal of receive signal.

4. An adaptive array antenna system according to claim 1, wherein said relative delay time is obtained by calculating cross-correlation between each component in each direction and a reference signal component.

5. An adaptive array antenna system according to claim 1, wherein directivity of arrival is defined for angle spacing of $360/2\pi N$ (degree), where N is number of antenna elements.

* * * * *